United States Patent
Hoernicke et al.

(10) Patent No.: US 10,409,248 B2
(45) Date of Patent: Sep. 10, 2019

(54) SYSTEM AND METHOD FOR AUTOMATION SYSTEM CONFIGURATION

(71) Applicant: ABB Schweiz AG, Baden (CH)

(72) Inventors: Mario Hoernicke, Landau (DE); Chaojun Xu, Weinheim (DE); Axel Haller, Gorxheimertal (DE); Rainer Drath, Mannheim (DE); Ralf Jeske, Petershagen (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/772,447

(22) PCT Filed: Nov. 2, 2015

(86) PCT No.: PCT/EP2015/075421
§ 371 (c)(1),
(2) Date: Apr. 30, 2018

(87) PCT Pub. No.: WO2017/076420
PCT Pub. Date: May 11, 2017

(65) Prior Publication Data
US 2018/0314222 A1 Nov. 1, 2018

(51) Int. Cl.
*G05B 19/042* (2006.01)

(52) U.S. Cl.
CPC ............ *G05B 19/0426* (2013.01); *G05B 2219/13148* (2013.01); *G05B 2219/15009* (2013.01)

(58) Field of Classification Search
CPC ...... G05B 19/0426; G05B 2219/15009; G05B 2219/13148
See application file for complete search history.

(56) References Cited

U.S. PATENT DOCUMENTS

| | | | |
|---|---|---|---|
| 7,389,204 B2* | 6/2008 | Eryurek | G05B 23/0272 340/506 |
| 8,473,917 B2* | 6/2013 | Weatherhead | G05B 23/0267 700/17 |
| 2011/0040390 A1* | 2/2011 | Blevins | G05B 19/0426 700/18 |
| 2014/0100676 A1 | 4/2014 | Scott et al. | |
| 2018/0095716 A1* | 4/2018 | Takahashi | G06F 3/165 |

FOREIGN PATENT DOCUMENTS

WO 2015135559 A1 9/2015

OTHER PUBLICATIONS

International Preliminary Report on Patentability Application No. PCT/EP2015/075421 dated Sep. 25, 2017 7 pages.
International Search Report Application No. PCT/EP2015/075421 Completed: May 11, 2016; dated May 19, 2016 3 pages.

* cited by examiner

Primary Examiner — Nathan L Laughlin
(74) Attorney, Agent, or Firm — Whitmyer IP Group LLC

(57) ABSTRACT

A configuration system and method for process automation configured to access structural process diagrams representing process components. Each process component includes interconnections between process components. Each interconnection represents a physical connection. The system has at least one processor configured to generate corresponding process object instances for process components wherein a particular component type defines at least an interlock property and/or an operating condition.

18 Claims, 6 Drawing Sheets

SYSTEM AND METHOD FOR AUTOMATION SYSTEM CONFIGURATION

TECHNICAL FIELD

The present invention generally relates to automation systems, and more particularly, relates to methods, computer program products and systems for configuration of field components in an automation system.

BACKGROUND

Automation systems are widely used to automatically control all kinds of field components, such as for example valves, pumps, or flow controllers, which are used to operate process plants. Today's process control system control logic is usually engineered using one of the five languages of IEC61131-3. IEC 61131-3 is the third part of the open international standard IEC 61131 for programmable logic controllers and was first published in December 1993 by the IEC. The current third edition was published in February 2013. Part 3 of IEC 61131 deals with programming languages and defines two graphical and two textual PLC programming language standards. The graphical programming languages are: Ladder diagram (LO), and Function block diagram (FBD). The textual programming languages are Structured text (ST), and Instruction list (IL). The fifth language is Sequential function chart (SFC), which has elements to organize programs for sequential and parallel control processing. A further language, Continuous Function Chart (CFC), is an extension to the IEC 61131-3 standard, which provides free positioning of graphic elements. That is, the languages defined in IEC 61131-3 either base on graphical engineering like function block diagrams, sequential functions charts, etc., or on simplified textual languages instruction list or structured text. In some cases, specific flavors of the five languages are used. Alternatively, ISO C may be used. ISO C is one of the successive standards for the C programming language published by the American National Standards Institute (ANSI) and the International Standards Organization (ISO).

With the increasing complexity of control solutions in automation systems, those languages are not fully appropriate anymore for the engineering and configuration of automation systems. The IEC 61131-3 standard languages do not match well with object oriented systems used nowadays in automation system solutions and need to be changed within the control engineering tools in order to be usable for such object oriented systems. For example the ABB System 800xA is such an object oriented control system, mostly used in process industries where the standard languages are not appropriate for the engineering and the configuration of the automation system because the traditional method to generate the control logic for the complex systems is error prone and may result in a malfunctioning of the automation system.

SUMMARY

There is therefore a need to reduce the complexity of the configuration of an automation system while at the same time reducing the probability for a malfunctioning of the automation system. This technical problem is solved by a configuration system for a process automation system, a respective method and a computer program product as disclosed by the independent claims.

The configuration system has an interface component to access one or more structural process diagrams. Examples for such structural process diagrams are so-called piping and instrumentation diagrams (P&ID) which are diagrams in the process industry showing the piping of a process flow together with the installed equipment and instrumentation. A particular structural process diagram includes a plurality of process component symbols representing process components to be controlled by the automation system. Each process component symbol is associated with a corresponding process component type. For example, the process component symbol may be selected from a symbol library which includes symbols for respective symbol types, such as for example pumps or valves. Such symbol types can then be associated with respective component types of components (field devices) of the automation system. A component type can include a description of properties or capabilities which are common to a specific group of components (e.g., controlled pumps, prescribed pumps, vaporizing valves, linear valves, compressible valves, etc.). Further, the diagram includes interconnections between the process component symbols. Each interconnection in the diagram represents a physical connection between respective process components (real world objects). Interconnections for physical connections are typically illustrated by solid lines between the components and are not to be confused with other connecting lines in the diagram (e.g., dotted lines) which may illustrate a communicative coupling of the components for the exchange of signals.

The configuration system further has at least one processor which is configured to perform the functions described in the following when executing a corresponding computer program which is loaded in a memory of the configuration system.

For at least a subset of the plurality of process component symbols, the processor(s) can generate a plurality of corresponding process object instances with the corresponding process component types. The process object instances are instantiated from corresponding process objects. In general, in object-oriented design, an object contains encapsulated data and procedures grouped together to represent an entity. The object interface defines how the object can be interacted with. The process objects comply with the five basic concepts of object-oriented design which are known by the skilled person as Object/Class, information hiding, inheritance, interface, and polymorphism. The process objects define data types, interfaces, methods, etc. for respective groups of process components (field devices). Thereby, a particular component type defines at least an interlock property and/or an operating condition in the interface of the corresponding process object instance. An interlock property of a particular process object instance leads to a "switch off" state of the particular process component and an operating condition of the particular process component prevents a "switch on" state of the component. In other words, for a particular process component (e.g., pump), interlock values of other process components (e.g., valves) force the particular process component to be switched off. For example, if all valves in the upstream of the pump are closed, the pump must be switched off. Operating condition values of other process components (e.g., valves) allow the particular process component to be switched on. For example, a valve in the downstream of the pump must be open; otherwise the pump is not allowed to operate.

For a particular process object instance representing a particular process component, the processor performs a discovery action, a query action, a selection or filtering action, and a connecting action. Firstly, one or more further process object instances are discovered by using the interconnections of the diagram. The discovered further process object instances represent process components that are physically connected with the particular process component in the real world. Secondly, the interfaces of the discovered further process object instances are queried and a list of process object instances is generated wherein the list includes the discovered process object instances which have an interlock property and/or an operating condition that is relevant for the particular process object instance. In other words, the process object instances included in the list relate to process components which have a direct impact on the operation of the particular process component in the real world. That is, the process object instances included in the list may have an output which may directly affect an input of the particular process component or they may have an input which may directly affect the output of the particular process component. Such interlock properties and operating conditions are of a Boolean type. Thirdly, a selection of one or more listed process object instances is obtained to interlock with the particular process object instance. In other words, the selected process object instances relate to the process components which are really relevant for proper operation of the particular process component. Fourthly, the interfaces of one or more selected process object instances are connected with the interface of the particular process object instance, accordingly. In other words, if the particular process component has real world physical connections to the process components represented by the selected process instances, the corresponding inputs and outputs of the corresponding process object instance interfaces are connected to enable the exchange of corresponding control signals.

In case the particular process instance object receives multiple interlock states and/or operating conditions from more than one further process object instance, the configuration system can compute aggregate states based on the plurality of individual interlock properties and/or operating conditions. Thereby, an unambiguous control state for the particular process component is determined.

In one embodiment, the configuration system can generate control logic code for the control of the particular process component based on the interface connections between the one or more selected process object instances and the interface of the particular process object instance. For example, the generated control logic can have a graphical programming language format.

In one embodiment, one or more queried interfaces of the listed process object instances may further include at least one continuous control parameter output which is compliant with at least one corresponding control parameter input of the interface of the particular process object instance. In this case, the at least one continuous control parameter output is mapped to the at least one corresponding control parameter input. Continuous control parameters may be used in control loops. For example, if the outflow of a pump is not allowed to fall under a predefined threshold value or is not allowed to exceed a predefined threshold value, the opening of a continuous controllable valve which is connected to the output of the pump can be adjusted based on the measured outflow (that is, the continuous control parameter) of the pump.

In one embodiment, a manual interconnection associated with the particular process object instance and a particular further process object instance is received wherein the corresponding process component symbols have no interconnection. The manual interconnection may be defined by a human user via an appropriate editing tool. The configuration system can then perform a plausibility check for the manual interconnection based on the compatibility of the corresponding interfaces of the particular further process object instance and the particular process object instance. Finally, the system may prompt the user of the configuration system with a notification if the corresponding interfaces are incompatible. In other words, a user may decide that two process object instances whose symbols have no interconnection in the diagram nevertheless should have an interface connection reflecting an interlock and/or operating condition dependence. However, in cases where the interfaces of the manually connected object instances are incompatible, the configuration system detects such incompatibilities and may notify the user accordingly because the manual configuration may lead to a malfunctioning of the manually configured process components in the real world.

In one embodiment, the configuration system can compose a cause-and-effect-matrix for the particular process object instance and the connected process object instances. The cause-and-effect-matrix reflects the process control configuration of the respective process components and provides a visualization of the process components of the technical status of the automation system. The cause-and-effect matrix can be updated during the operation of the automation system. This allows a user (e.g., an operator) of the automation system to monitor the configuration status of the respective real world process components at any time and to intervene in case the technical status indicates a need for manual interaction.

In further embodiments, a computer program product when loaded into a memory of the configuration system and executed by at least one processor of the configuration system causes the system to execute the steps of the respective computer-implemented method to perform the described functions of the configuration system.

Further aspects of the invention will be realized and attained by means of the elements and combinations particularly depicted in the appended claims. It is to be understood that both, the foregoing general description and the following detailed description are exemplary and explanatory only and are not restrictive of the invention as described.

DETAILED DESCRIPTION

Figure 1:
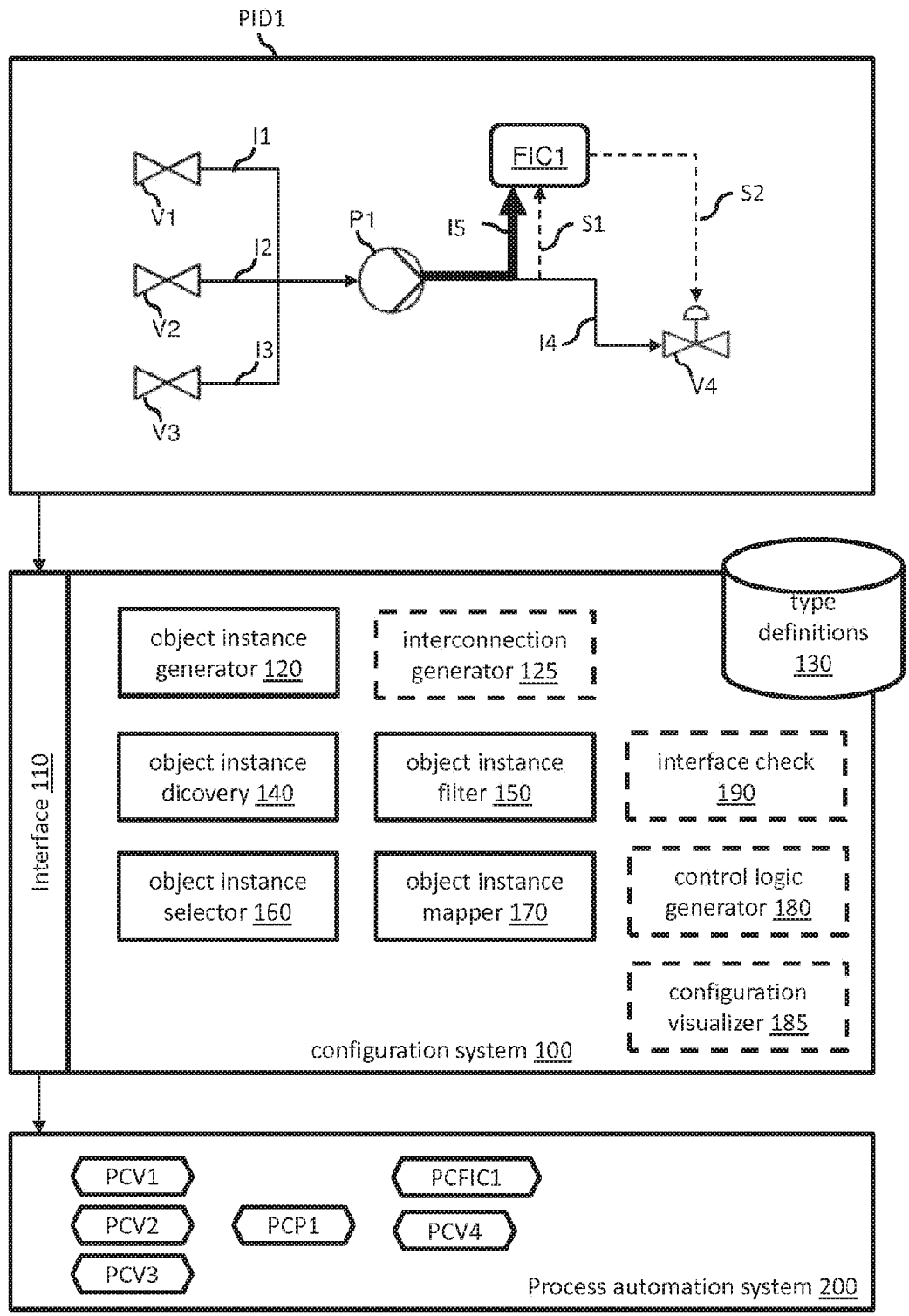
FIG. 1 is a simplified diagram illustrating configuration of an automation system by a configuration system using a structural process diagram according to one embodiment of the invention.
Figure 2:
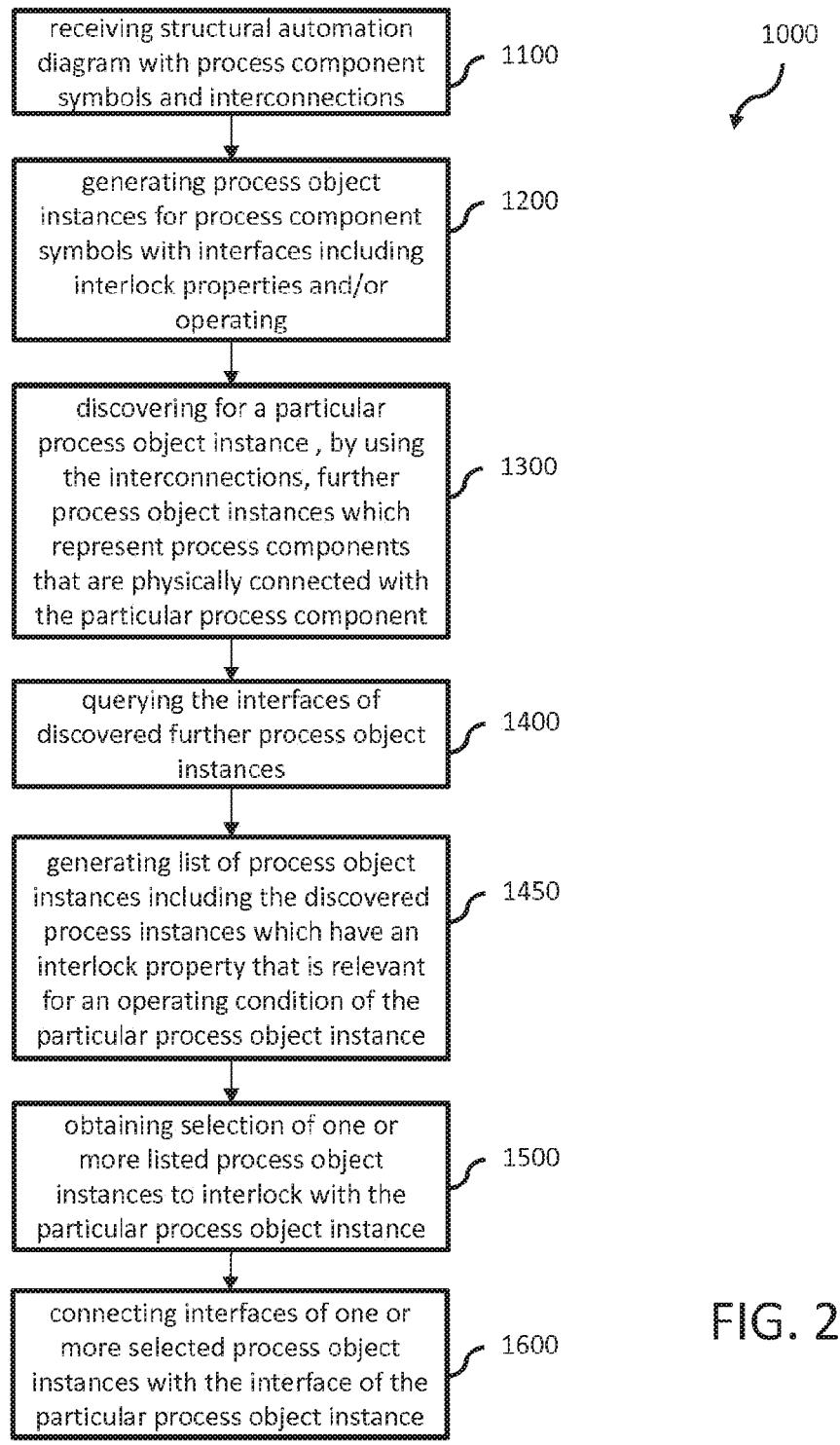
FIG. 2 is a simplified flowchart of a computer-implemented method for configuring process components of an automation system used to control a technical process according to one embodiment of the invention.

FIG. 1 is a simplified diagram illustrating configuration of an automation system 200 by a configuration system 100 using a structural process diagram PID1 according to one embodiment of the invention. FIG. 1 is described in the context of FIG. 2 showing a simplified flowchart of a computer-implemented method 1000 executed by the configuration system 100 for configuring process components of the automation system 200 which are used to control a technical process. Reference numbers refer to FIG. 1 or FIG. 2.

The interface component 11 O of the configuration system 100 allows communicative coupling of the configuration system 100 with the process automation system 200 and with a data storage component for structural process diagrams PID1. In one embodiment, the structural process diagrams may be stored directly in a memory component of the configuration system 100. In the example of FIG. 1, the structural process diagram is a so-called piping and instrumentation diagram (P&ID). There exist multiple standards (e.g., DIN EN 62424:2010-01; VOE 0810-24:2010-01 or DIN EN ISO 10628-1:2013-07) for P&ID diagrams known by the person skilled in the art. Other appropriate notations, such as for example system control diagrams according to the NORSOK Standard 1-005, Rev. 2, April 2005 (available at www.standard.no/pagefiles/1220/i-005.pdf), can be used as well. PID1 includes the process component symbols: V1, V2, V3 representing valves which have two states (open, closed), V4 representing a control valve which has multiple states (fully or partially open or closed), P1 representing a pump for moving fluids or gas, and FIC1 representing a flow controller which can control the opening state of the control valve V4. The interconnections 11 to 14 represent physical connections between the pump P1 and the valves V1 to V4, respectively. That is, in the real world automation system the corresponding valve process components PCV1 to PCV4 are connected with the pump process component PCP1 via liquid/gas transportation elements (e.g., tubes). The flow controller symbol FIC1 is connected with the control valve symbol V4 via the dashed line S2 which represents a communicative coupling of the respective process components PCFIC1 and PCV4 in the real world automation system. In other words, S2 represents a signal exchange channel between FIC1 and V4 for sending control signals from the flow controller to the control valve. Further, the flow controller symbol FIC1 is connected with the interconnection 14 via the dashed line S1 which represents a communicative coupling of the respective process component PCFIC1 with a flow sensor mounted in the tube at the pump output in the real world automation system. The flow sensor can measure the flow at the pump output and communicate the flow data to the flow controller.

The configuration system 100 can access the diagram PID1 via the interface 11 O and perform an analysis of the diagram. In other words, the configuration system receives 1100 the diagram PID1 in a machine readable format. The diagram is provided in a digital format which is known by the configuration system and which supports symbol types for the various symbols used in the diagram. For example, the symbols V1 to V3 are of type "valve", the symbol P1 is of type "pump", the symbol V4 is of type "control valve", and the symbol FIC1 is of type "flow controller". The object instance generator (OIG) 120 can generate a process object instance for a corresponding process component symbol based on a component type which is associated with the respective symbol type. The configuration system stores or can access component type definitions 130 where information regarding objects of a given type is stored which is needed to instantiate the corresponding process object instances. The component types in the type definitions 130 can be mapped to the symbol types of the diagram PID1. For example, a semantic mapping may be performed based of the type names. Alternative mappings may be used via IDs or other properties which allow an unambiguous mapping of symbol types to component types. For example, the type definitions 130 may be implemented as a library including domain specific component types for different process industries (domains). For example, different domains may use different types of pumps. However, the operating conditions can be the same for a plurality of pump types across all domains. In this case, the component type may have a domain independent wrapper including the operating condition and a domain specific inner part for defining the domain specific properties of the respective process component. In other words, the component type can have multiple layers like an onion model as it is well known in object-oriented programming.

In the example, the OIG 120 identifies the symbol P1 and maps the symbol type "pump" to a corresponding component type (e.g., "pump", P1, etc.) defined in the type definitions 130. The component type defines the interface for object instances of this type including interlock properties and/or operating conditions.

The OIG 120 can then generate 1200 a process object instance for the symbol P1 wherein the process object instance automatically includes an interface with all interlocks and/or operating conditions for the pump. For the pump object instance an operating condition, which defines under which conditions the pump can be switched on, is generated in the pump (object instance) interface. Further, interlocks which define the conditions under which the pump is switched off can be generated in the pump interface. The process object instance generation 1200 is repeated for all symbols of the diagram with a symbol type which can be mapped to a corresponding component type in the type definitions 130. In the example, further process object instances are generated 1200 for the symbols V1 to V4 and FIC1. For example, for the valve symbols V1 to V3 corresponding valve object instances are generated. That is, based on the object types defining for example types, interfaces, and methods of an object of the respective object type the corresponding coding is generated for each of the valve symbols V1 to V3 as corresponding object instance. A person skilled in the art of object-oriented programming can use all concepts known from object-oriented programming including class diagrams, the concept of inheritance, etc. In the example, the valve interfaces include interlock properties in their interfaces which may correspond to interlock properties or operating conditions in the pump interface.

The object instance discovery (01D) component 140 discovers 1300 (identifies), in relation to the pump instance, such generated object instances where the corresponding real world process components have a physical connection to the pump. For this purpose, the OID 140 analyzes which symbols in the diagram PID1 have an interconnection with the pump symbol P1. Such analysis can be performed by using standard image processing techniques used for object identification in two-dimensional pixel graphics. Alternatively, the interconnections 11 to 14 in the PID1 may be graphical objects having a "from to" property which indicates the symbols at the beginning and the end of the respective interconnection. In this embodiment, the discovery 1200 simply looks for all interconnections with the pump symbol P1 as an end or a beginning and identifies the symbol at the complementary ending of each identified interconnection.

The object instance filter (OIF) 150 can filter the discovered process object instances and keep such instances which provide an output that has direct impact on the operation of the pump. In other words, the filtered instances provide a control output signal which feeds into a corresponding input of the pump (object instance) interface. The filtering is achieved by querying the interfaces of the discovered process object instances and generating a filtered list wherein the filtered list includes only such discovered instances which have an interlock property and/or an operating condition that is relevant for the pump instance. In other words, a discovered process object instance is added to this list if the interface of the instance has an interlock property and/or an operating condition which has a corresponding counterpart in the pump instance interface. That is, an output of filtered instance interface corresponds to an input of the pump instance interface or an output of the pump instance interface corresponds to an input of a filtered instance interface. In the example, the valve (V1 to V3) instance interfaces have outputs which feed into an input of the pump instance interface and the pump instance interface has an output which feeds into an input of the control valve (V4) instance interface. It is clear, that those dependencies at the process object instance level reflect real world dependencies of the respective process components PCV1, PCV2, PV3 with PCP1 and PCP1 with PCV4, respectively. For example, the pump can only be switched on if at least one of the valves is open, and the pump needs to be switched off if the control valve is closed. In other words, the real world interlock/operating condition mechanisms are reflected in the control software implementation of the automation system.

The interfaces of the discovered further process object instances are queried 1400 and a list of process object instances is generated 1450 wherein the list includes the discovered process object instances. In other words, the process object instances included in the list relate to process component which may have a direct impact on the operation of the particular process component in the real world because they have an output which may directly affect an input of the particular process component or they may have an input which may directly affect the output of the particular process component. Such interlock properties and operating conditions are of a Boolean type. That is, the interlock or operating condition values are either TRUE or FALSE.

The object instance selector (OIS) 160 obtains 1500 a selection of one or more listed process object instances to interlock with the pump instance. In other words, the selected process object instances relate to the process components which are relevant for proper operation of the pump process component PCP1 in the automation system 200. For example, the OIS can use the description of the interfaces or other information from the type definitions 130 to check whether there is a match of the respective interfaces so that a dependency between the process object instances can be automatically derived. In an alternative embodiment, the OIS 160 can prompt a user with the list of filtered object instances for a confirmation of the instances which are to be selected to ensure proper operation of the pump in the real world. The selection by the user is then received by the OIS 160 for further processing. In the example, the valve instances are selected as interlock properties for the pump interface and the control valve instance is selected as input for the operating conditions of the pump interface.

The object instance mapper (OIM) 170 finally connects 1600 the interfaces of the selected instances with the pump instance interface. As a result, a configuration for controlling the real world pump process component and the valve components represented by the selected process instances is obtained by the configuration system. The corresponding inputs and outputs of the corresponding process object instance interfaces are connected accordingly to enable the exchange of corresponding control signals in the automation system 200.

The components of the configuration system 100 which are illustrated by dashed lines can be included by optional embodiments of the system 100 as disclosed in the following.

In one embodiment, the configuration system 100 further includes the interconnection generator (IG) 125. The IG 125 can provide a user interface function which allows an operator of the configuration system 100 to interact with the system via standard input/output (1/0) means (not shown), such as for example a display unit and input means like a mouse, keyboard, touch screen, etc. The operator may provide input via this interface to complement the existing diagram PID1 with additional process component symbols and or interconnections. In case a process component symbol is added, the configuration system can generate a corresponding process object instance by using the previously disclosed functions. In the example, a new interconnection may be added (e.g., interconnection 15 between the symbols P1 and FIC1 illustrated by a bold line, or even interconnections with manually added symbols). The configuration system receives the manually added interconnection 15 and therefore will discover the corresponding process object instance as an instance representing the process component PCFIC1 which is now defined by the operator as physically connected to PCP1. The interface check (IC) 190 can then perform a plausibility check for the manual interconnection based on the compatibility of the corresponding interfaces of the flow controller instance and the pump instance. If the corresponding interfaces are incompatible, the IC 190 can prompt the operator of the configuration system with a corresponding notification via the 1/0 means of the system. For example, the operator may be prompted to confirm the manual interconnection with a warning that the interfaces are incompatible and that this may lead to a malfunctioning of the corresponding real world process components. In the example of the interconnection 15 a warning may be generated because PCFIC1 and PCP1 have no physical connection, and therefore, no corresponding compatible interfaces.

In one embodiment, the OIM 170 is further configured to map continuous control parameter outputs of a process object instance interface to a corresponding control parameter input of another process object instance interface. A continuous control parameter is of type REAL or FLOATING or of any other type which is appropriate for reflecting a continuous value range. For example, the PCFIC1 may receive from measured flow sensor (e.g., mounted in a tube at the output of the pump) output flow data for the fluid or gas flow through the pump via signal S1. The outflow can vary between O and a maximum value which depends on the input flow of the pump. In the example, the PCFIC1 may be used to control the control valve PCV4 via control signal S2 in such a way that the pump outflow is kept constant within a predefined tolerance range. For example, the flow sensor can measure a flow parameter regarding the transported medium (e.g., material in kg/h) and may transform the measured value into electronic signal S1 which is sent to the flow controller. The flow controller compares the measured value with a predefined value. In case of a deviation from the predefined value the flow controller computes control value which is then sent to the to-be-controlled valve via signal S2. In the example a pneumatic valve PCV4 is used. In this case the flow controller may compute for example that the valve needs to be open at 80% which may correspond to a control value of 3 bar communicated via S2. Examples for flow controllers of this kind are so-called proportional-integral-derivative controllers. Also the control signal S2 can be a continuous control parameter. At the process object instance level the corresponding interfaces of the pump instance, the flow controller instance and the control valve instance have continuous control parameter inputs and outputs which can be mapped accordingly by the OIM 170. For example, the mapping may be performed only in cases where the interface check 190 does not detect any interface incompatibility.

In one embodiment, the configuration system includes the control logic generator 180 which can generate, from the interface connections between one or more selected process object instances with the interface of a particular process object instance, control logic code for the control of the corresponding process components. In the example, the control logic code for the pump configuration can be automatically generated based on the interfaces of the valve instances interfaces, the control valve instance interface, the flow controller instance interface and the pump instances interface. An example of a generated graphic control logic code is disclosed in FIG. 6.

In one embodiment, the configuration system 200 includes the configuration visualizer (CV) 185 which is configured to visualize the configuration of the automation system to the system operator or other users. The configuration status can thereby be visualized during the operation of the automation system so that, during operation, the technical status of the process components can be monitored through the visualization and the operator can take effective counter measures if the status of any one of the monitored component indicates a problem or a malfunctioning of the respective component. In one example the visualization of the configuration status of the process components is achieved by composing (and displaying) a cause-and-effect-matrix for the process components. In the example, the cause-and-effect matrix can reflect the process control configuration of the valve, the control valve and the pump components. An example of a cause-and-effect-matrix is disclosed in FIG. 7.

Figure 3A:
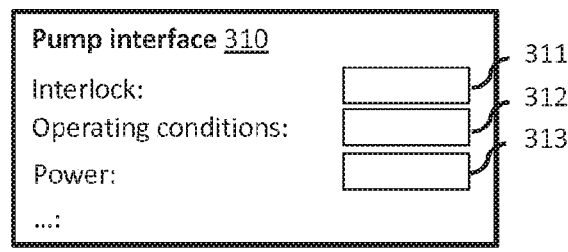
FIGS. 3A to 3C illustrate a simplified example of a process object instance interface for a pump at different points of a pump configuration process.
Figure 3B:
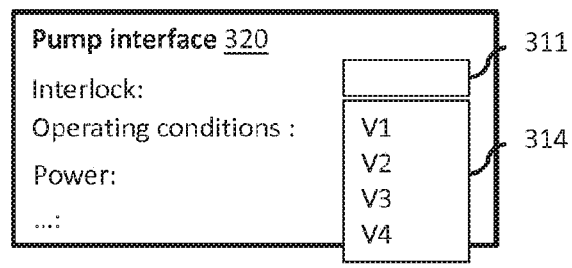

FIGS. 3A to 3B illustrate a simplified example of a process object instance interface 310, 320, 330 for a pump at different points of the pump configuration process. FIG. 3A shows a user interface (UI) visualization of the pump interface 31 O after the corresponding process object instance has been generated by the OIG as it could be shown to a user/operator of the configuration system. The pump's interlock 311 and operating conditions 312 are automatically included in the interface 31 O as defined by the respective object type which was used for the instantiation of the pump object instances. Besides the interlock and operating conditions further interface fields may be generated (e.g., power 313, etc.).

FIG. 3B illustrates the UI for the pump interface 320 which may be used for obtaining a selection of discovered and listed process object instances. In the example, the discovery and querying of the process object instances having interconnections with the pump instance leads to the list 314 where the valve instances V1 to V3 and the control valve instance V4 are listed as possible interlock inputs for the pump. The listed object instances were identified by querying their respective interfaces and identifying corresponding interlock/output conditions. The list 314 may prompt a user/operator of the configuration system to indicate a selection of object instances which are to be connected with the interlock of the pump instance interface. A similar list can be used to prompt the user/operator when providing a selection for the operating conditions 312 of the pump interface.

Figure 3C:
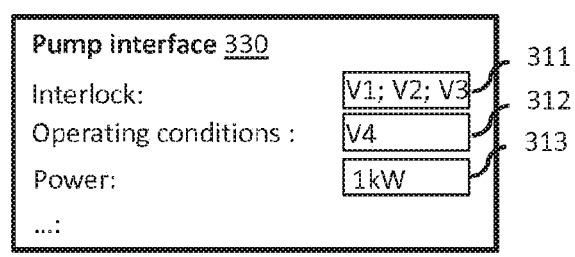

FIG. 3C illustrates the UI for the pump interface 330 after the selection has been received. In the example, the valve instances V1 to V3 were selected as interlocks 311. The control valve instance V4 was selected as operating condition 312 for the pump. The power 313 value "1 kW" may be automatically retrieved as a default value from an electronic data sheet for the respective pump or it may be manually input by the user/operator. Further interface parameters may be included. The mapping of the interlocks and operating conditions in the respective UI fields 311, 312 finally leads to a configuration of the respective process components to actually connect the respective interfaces for enabling the exchange of control signals in the automation system.

The configuration parameters may also be set fully automatically by the configuration system when the object typed definitions provide sufficient information to perform an automatic unambiguous mapping of the interfaces.

Figure 4:
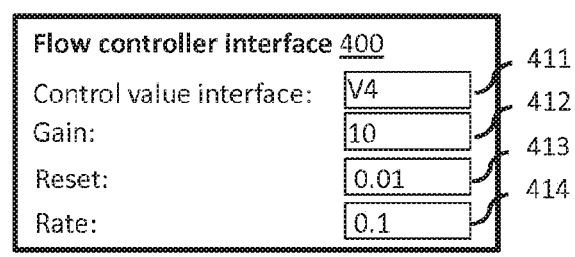
FIG. 4 illustrates a simplified example of a process object instance interface for a flow controller.

FIG. 4 illustrates a simplified example of a process object instance interface 400 for a flow controller. In the example, the flow controller interface 400 includes the control value interface 411 as a field for the device ID of the to-be-controlled process component (e.g., V4) as well as a set of parameters which define the control behavior of the flow controller. Gain 412, reset 413 and rate 414 are typical parameters for proportional-integral-derivative flow controllers which are well known by the person skilled in the art.

Figure 5:
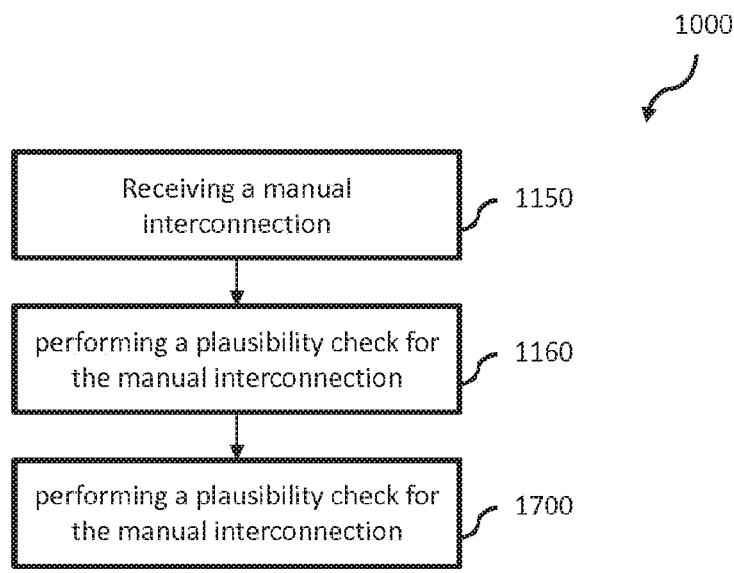
FIG. 5 illustrates optional steps of the computer-implemented method for configuring process components.

FIG. 5 illustrates some further (optional) steps of the computer-implemented method 1000. In addition to the automatic discovery of interconnection from a structural process diagram the configuration system may receive 1150 via an appropriate user interface a manual interconnection associated with the particular process object instance and a particular further process object instance. Thereby, the corresponding process component symbols have no interconnection in the structural process diagram. However, an operator/user may be of the opinion that there is a real world physical connection between the two process components. In this case the system allows the user to add a corresponding interconnection manually. In the example of FIG. 1 the interconnection 15 is manually added between the process component symbols P1 and FIC1. Any user interface which allows the editing of the received structural process diagram in a way to define interconnections between the symbols may be used for this purpose. In order to avoid malfunctioning of the automation system in case a user adds a wrong interconnection the system can further perform 1160 a plausibility check for the manual interconnection based on the compatibility of the corresponding interfaces of the particular further process object instance and the particular process object instance. In case the corresponding interfaces are incompatible the system can prompt a configuration user with a corresponding notification. The prompt may occur through a text warning, an audio signal, or a visual indication (e.g., the interconnection is highlighted, blinking or otherwise visually emphasized). The configuration user can then confirm the interconnection in which case the interface mapping is performed manually by the configuration user or the user can accept the warning and the system may cancel or invalidate the manual interconnection.

Figures 6, 7:
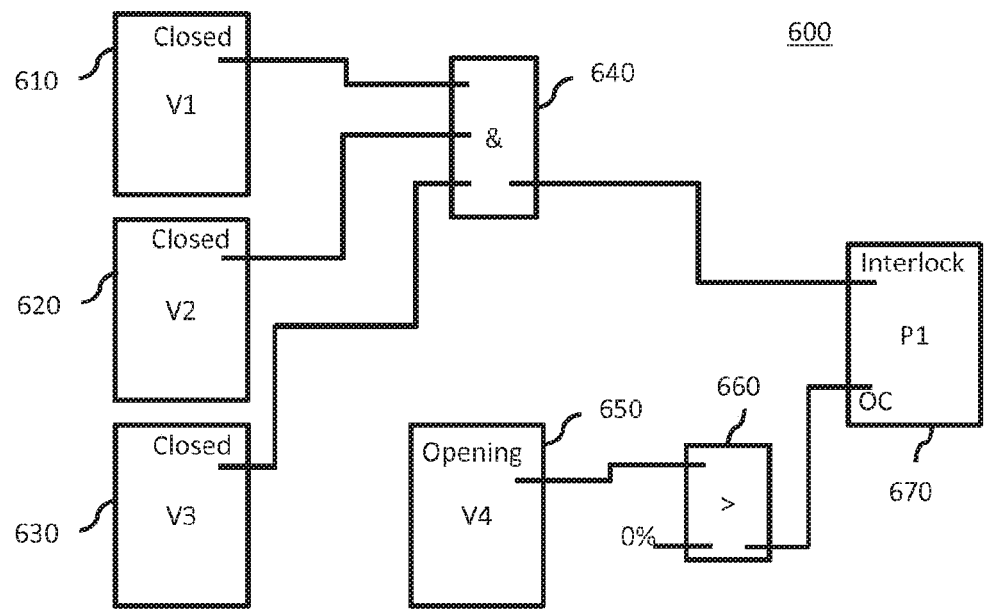
FIG. 6 illustrates a simplified example of graphic control logic code which can be generated according to an embodiment of the invention.
FIG. 7 is an example of a cause-and-effect matrix for a particular example of process components of the automation system.

Once the system has connected (1600, cf. FIG. 2) the interfaces of one or more selected process objects it may automatically generate 1700 control logic code for the control of the particular process component. FIG. 6 illustrates control logic code generation for the scenario of FIG. 1. The code generation thereby is based on the interface connections between the one or more selected process object instances with the interface of the particular process object instance.

FIG. 6 illustrates a simplified example of graphic control logic code 600 which can be generated according to an embodiment of the invention. FIG. 6. shows a control logic diagram which may be generated from PID1 as shown in FIG. 1. For each of the process component symbols: V1 . . . V4, P1 a corresponding instance of a control function block is generated. The control function blocks are illustrated by the entities 61 O for V1, 620 for V2, 630 for V3, 650 for V4, and 670 for P1. According to the interlocks and operating conditions defined for the pump P1 (cf. FIG. 3C), the required Boolean logic is described with block 640 (AND condition) and block 660 (greater than condition). Block 640 uses the opening state of the control function blocks 610, 620,630 for evaluation, If ALL of the valves that are upstream of the pump are closed, block 640 produces a TRUE signal on its output and will stop the pump by sending the TRUE signal to the interlock input of the pump. If any of the upstream valves (V1, V2, V3 with control blocks 610, 620, 630, respectively) is open, block 640 produces a FALSE signal and send the FALSE signal to the pump control block, hereby allowing it to start automatically or upon user request.

In addition, the operating condition for the pump is controlled by the downstream control valve V4 through the control function block 650. Block 660 (greater than) checks whether the opening of the control valve is greater than 0%, which means there is some opening of the valve. The "greater than" operation produces a TRUE signal if the valve has an opening greater than 0% and, therefore, allows the pump control block 670 to operate. If the valve V4 is closed, the "greater than" block produces a FALSE signal and sends this signal to the control block 670 of the pump to disable the operation of the pump. FIG. 7 is an example of a cause-and-effect matrix 700 for a particular example of process components of the automation system. In the example, the logic as described by the control code from FIG. 6 is shown in a cause-and-effect matrix style. The matrix can be read like described in the following:

a) Rows represent a cause (e.g. a valve is certainly closed or a pump is running at the moment)
b) Columns represent an effect that shall take place and certain circumstances (e.g. a pump is stopped or a valve is closed)
c) The second column is an exception where a Boolean operation may be used in order to connect a set of causes in a logic manner (e.g. the AND function from FIG. 6/block 640)
d) The matrix entries "X" and ">0" are descriptions of the connections between the causes and the effects, where "X" means: if the cause is happening, the effect shall take place, and where ">0" means: the effect shall take place and the value of the cause is above the numerical value zero The interconnections as described in FIG. 7 are examples. A skilled person can use any other operator which is appropriate to be used in C&E matrixes (not just "X" and">".)

In the specific example in FIG. 7, the control logic from the control logic diagram of FIG. 6 is described. The causes: V1.closed to V3.closed (all upstream valves are closed because the causes are connected using the AND operator in the second column) result in the interlock input of the pump (P1.Interlock) set to TRUE. Additionally, V4.Opening (the current opening angle of V4) is taken into account for the operating condition of the pump (P1.OC). If the opening angle is greater than zero (">0") then the pump is allowed to start, because the operating condition is set to true.

Figure 8:
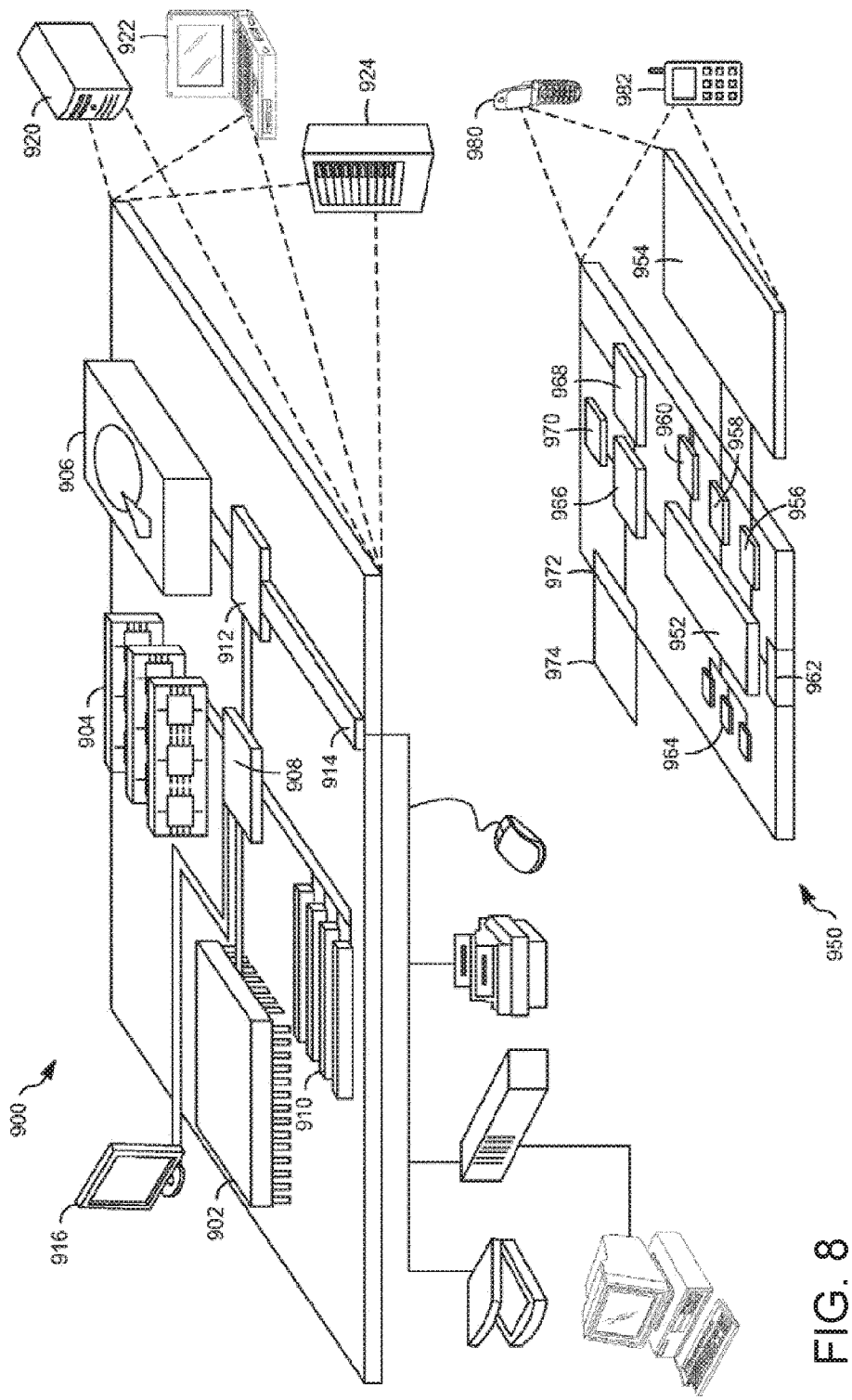
FIG. 8 is a diagram that shows an example of a generic computer device 900 and a generic mobile computer device 950, which may be used with the techniques described here.

FIG. 8 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to the computer system 100 of FIG. 1. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLEO (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TOMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A configuration system for a process automation system, comprising:
    an interface component configured to access one or more structural process diagrams (PID1) wherein a particular diagram (PID1) includes a plurality of process component symbols (V1 to V4, P1, FIC1) representing process components (PCV1 to PCV4, PCP1, PCFIC1) under control of the automation system, each process component symbol being associated with a corresponding process component type, and wherein the particular diagram (PID1) further includes interconnections (I1 to I4) between the process component symbols, each interconnection representing a physical connection between respective process components; and
    at least one processor configured to:
    for at least a subset of the plurality of process component symbols, generate a plurality of corresponding process object instances with the corresponding process component types wherein a particular component type defines at least an interlock property and/or an operating condition in an interface of the corresponding process object instance, wherein both are of a Boolean type and the interlock property of a particular selected process object instance leads to a switch off state of the particular process component and an operating condition of the particular process component prevents a switch on state so that interlock values of other process components force the particular process component to be switched off and operating condition values of other process components allow the particular process component to be switched on;
    for a particular process object instance representing a particular process component:
        discover, by using the interconnections (I1, I2, I3 . . . ) of the diagram (PID1), one or more further process object instances which represent process components that are physically connected with the particular process component;
        query the interfaces of the discovered further process object instances and generate a list of process object instances, the list includes the discovered process object instances which have an interlock property and/or an operating condition that is relevant for the particular process object instance, the process object instances in the list have an output that directly affects an input of the particular process component or an input that directly affects an output of the particular process component, and where an interlock property is relevant for an operating condition of the particular process object instance;
        obtain a selection of one or more listed process object instances including checking whether there is a match of the respective interfaces so that a dependency between the process object instances can be automatically derived; and
        connect the interfaces of one or more of the selected process object instances with the interface of the particular process object instance, accordingly, wherein the corresponding inputs and outputs of the corresponding process object instance interfaces are connected to enable the exchange of corresponding control signals.

2. The system according to claim 1, wherein one or more queried interfaces of the listed process object instances further include at least one continuous control parameter output which is compliant with at least one corresponding control parameter input of the interface of the particular process object instance, the at least one processor further configured to:
    map the at least one continuous control parameter output to the at least one corresponding control parameter input.

3. The system according to claim 2, the interface component further configured to:
  receive a manual interconnection (I5) associated with the particular process object instance and a particular further process object instance wherein the corresponding process component symbols have no initial interconnection in the particular diagram (PID1).

4. The system according to claim 2, wherein the at least one processor is further configured to:
  compose a cause-and-effect-matrix for the particular process object instance and the connected process object instances, the cause-and-effect-matrix reflecting the process control configuration of the respective process components.

5. The system according to claim 2, wherein an aggregate of a plurality of interlock properties and/or operating conditions defines a control state for the particular process component.

6. The system according to claim 2, wherein the at least one processor is further configured to:
  generate from the interface connections between the one or more selected process object instances with the interface of the particular process object instance control logic code for the control of the particular process component.

7. The system according to claim 1, the interface component further configured to:
  receive a manual interconnection (I5) associated with the particular process object instance and a particular further process object instance wherein the corresponding process component symbols have no initial interconnection in the particular diagram (PID1).

8. The system according to claim 7, wherein the at least one processor is further configured to:
  perform a plausibility check for the manual interconnection (I5) based on the compatibility of the corresponding interfaces of the particular further process object instance and the particular process object instance, and to prompt a user of the configuration system with a notification if the corresponding interfaces are incompatible.

9. The system according to claim 1, wherein the at least one processor is further configured to:
  compose a cause-and-effect-matrix for the particular process object instance and the connected process object instances, the cause-and-effect-matrix reflecting the process control configuration of the respective process components.

10. The system according to claim 1, wherein an aggregate of a plurality of interlock properties and/or operating conditions defines a control state for the particular process component.

11. The system according to claim 1, wherein the at least one processor is further configured to:
  generate from the interface connections between the one or more selected process object instances with the interface of the particular process object instance control logic code for the control of the particular process component.

12. A computer-implemented configuration method for configuring process components of a process automation system used to control a technical process, comprising:
  receiving a structural automation diagram (PID1) wherein the diagram (PID1) includes a plurality of process component symbols representing process components of the automation system with each process component symbol being associated with a corresponding process component type, and further includes interconnections between the process component symbols, each interconnection representing a physical connection between respective process components;
  for at least a subset of the plurality of process component symbols, generating a plurality of corresponding process object instances with the corresponding process component types wherein a particular component type defines at least an interlock property and/or an operating condition in an interface of the corresponding process object instance, wherein both of a Boolean type and where the interlock property of a particular selected process object instance leads to a switch off condition for the particular process component and the operating condition of the particular process component prevents a switch on condition so that interlock values of other process components force the particular process component to be switched off and operating condition values of other process components allow the particular process component to be switched on;
  for a particular process object instance representing a particular process component:
    discovering, by using the interconnections of the diagram (PID1), one or more further process object instances which represent process components that are physically connected with the particular process component;
    querying the interfaces of the discovered further process object instances and generating a list of process object instances, the list includes the discovered process object instances which have an interlock property and/or an operating condition that is relevant for the particular process object instance by having corresponding counterparts in the particular process object instance, the process object instances in the list have an output that directly affects an input of the particular process component or an input that directly affects an output of the particular process component, and where an interlock property is relevant for an operating condition of the particular process object instance;
    obtaining a selection of one or more listed process object instances including checking whether there is a match of the respective interfaces so that a dependency between the process object instances can be automatically derived; and
    connecting the interfaces of one or more selected process object instances with the interface of the particular process object instance, accordingly, wherein the corresponding inputs and outputs of the corresponding process object instance interfaces are connected to enable the exchange of corresponding control signals.

13. The method according to claim 12, wherein one or more queried interfaces of the listed process object instances further include at least one continuous control parameter output which is compliant with at least one corresponding control parameter input of the interface of the particular process object instance, and connecting further includes mapping the at least one continuous control parameter output to the at least one corresponding control parameter input.

14. The method according to claim 13, further including:
  in addition to discovering, receiving a manual interconnection associated with the particular process object instance and a particular further process object instance wherein the corresponding process component symbols have no interconnection.

15. The method according to claim 12, further including: in addition to discovering, receiving a manual interconnection associated with the particular process object instance and a particular further process object instance wherein the corresponding process component symbols have no interconnection.

16. The method according to claim 15, wherein querying further includes:
performing a plausibility check for the manual interconnection based on the compatibility of the corresponding interfaces of the particular further process object instance and the particular process object instance, and prompting a configuration user with a notification if the corresponding interfaces are incompatible.

17. The method according to claim 12, further including: generating from the interface connections between the one or more selected process object instances with the interface of the particular process object instance control logic code for the control of the particular process component.

18. A computer program product that when loaded into a memory of a computing device and executed by at least one processor of the computing device executes the steps of the computer implemented method, the method including:
receiving a structural automation diagram (PID1) wherein the diagram (PID1) includes a plurality of process component symbols representing process components of the automation system with each process component symbol being associated with a corresponding process component type, and further includes interconnections between the process component symbols, each interconnection representing a physical connection between respective process components;
for at least a subset of the plurality of process component symbols, generating a plurality of corresponding process object instances with the corresponding process component types wherein a particular component type defines at least an interlock property and/or an operating condition in an interface of the corresponding process object instance, wherein both of a Boolean type and where the interlock property of a particular selected process object instance leads to a switch off condition for the particular process component and the operating condition of the particular process component prevents a switch on condition so that interlock values of other process components force the particular process component to be switched off and operating condition values of other process components allow the particular process component to be switched on;
for a particular process object instance representing a particular process component:
discovering, by using the interconnections of the diagram (PID1), one or more further process object instances which represent process components that are physically connected with the particular process component;
querying the interfaces of the discovered further process object instances and generating a list of process object instances, the list includes the discovered process object instances which have an interlock property and/or an operating condition that is relevant for the particular process object instance by having corresponding counterparts in the particular process object instance, the process object instances in the list have an output that directly affects an output of the particular process component or an input that directly affects an output of the particular process component, and where an interlock property is relevant for an operating condition of the particular process object instance;
obtaining a selection of one or more listed process object instances including checking whether there is a match of the respective interfaces so that a dependency between the process object instances can be automatically derived; and
connecting the interfaces of one or more selected process object instances with the interface of the particular process object instance, accordingly, wherein the corresponding inputs and outputs of the corresponding process object instance interfaces are connected to enable the exchange of corresponding control signals.

* * * * *